United States Patent
Zhang et al.

(10) Patent No.: US 10,189,742 B2
(45) Date of Patent: Jan. 29, 2019

(54) GLASS FIBER, COMPOSITION FOR PRODUCING THE SAME, AND COMPOSITE MATERIAL COMPRISING THE SAME

(71) Applicant: JUSHI GROUP CO., LTD., Tongxiang (CN)

(72) Inventors: Lin Zhang, Tongxiang (CN); Guorong Cao, Tongxiang (CN); Wenzhong Xing, Tongxiang (CN); Guijiang Gu, Tongxiang (CN)

(73) Assignee: JUSHI GROUP CO., LTD., Tongxiang (CN)

( * ) Notice: Subject to any disclaimer, the term of this patent is extended or adjusted under 35 U.S.C. 154(b) by 0 days.

(21) Appl. No.: 15/805,159

(22) Filed: Nov. 7, 2017

(65) Prior Publication Data
US 2018/0086661 A1 Mar. 29, 2018

Related U.S. Application Data

(63) Continuation-in-part of application No. PCT/CN2015/091987, filed on Oct. 15, 2015.

(51) Int. Cl.
| | | |
|---|---|---|
| *C03C 13/00* | (2006.01) | |
| *C03C 3/087* | (2006.01) | |
| *C03C 3/112* | (2006.01) | |
| *C03C 3/118* | (2006.01) | |
| *C03C 3/091* | (2006.01) | |

(52) U.S. Cl.
CPC ............ *C03C 13/00* (2013.01); *C03C 3/087* (2013.01); *C03C 3/091* (2013.01); *C03C 3/112* (2013.01); *C03C 3/118* (2013.01); *C03C 2213/00* (2013.01)

(58) Field of Classification Search
CPC ....... C03C 13/00; C03C 13/046; C03C 3/087; C03C 3/091; C03C 3/112; C03C 3/118; C03C 13/06
See application file for complete search history.

(56) References Cited

U.S. PATENT DOCUMENTS

| | | | | |
|---|---|---|---|---|
| 4,199,364 A * | 4/1980 | Neely | ............... | C03C 3/087 |
| | | | | 501/35 |
| 8,912,107 B2 * | 12/2014 | Zhang | ............... | C03C 13/00 |
| | | | | 501/35 |
| 9,428,414 B2 * | 8/2016 | Zhang | ............... | C03C 13/00 |
| 2009/0286440 A1 * | 11/2009 | Lecomte | ............... | C03C 3/087 |
| | | | | 442/181 |
| 2013/0203583 A1 * | 8/2013 | Zhang | ............... | C03C 13/00 |
| | | | | 501/38 |
| 2013/0244858 A1 * | 9/2013 | Li | ............... | C03C 3/087 |
| | | | | 501/35 |
| 2018/0086661 A1 * | 3/2018 | Zhang | ............... | C03C 3/087 |

FOREIGN PATENT DOCUMENTS

| | | | | |
|---|---|---|---|---|
| CN | 101734862 A | 6/2010 | | |
| CN | 102491644 A | 6/2012 | | |
| CN | 102849956 A | 1/2013 | | |
| CN | 102849958 A | 1/2013 | | |
| CN | 103781736 A | 5/2014 | | |
| CN | 104743888 A | 7/2015 | | |
| JP | 2003054993 A | 2/2003 | | |
| RU | 2232729 C2 | 7/2004 | | |
| RU | 2370463 C2 | 10/2009 | | |
| WO | 9912858 A1 | 3/1999 | | |
| WO | 2006064164 A1 | 6/2006 | | |
| WO | WO-2017063167 A1 * | 4/2017 | ............. | C03C 3/087 |

OTHER PUBLICATIONS

The World Intellectual Property Organization (WIPO) International Search Report for PCT/CN2015/091987 dated Jul. 18, 2016 2 Pages.
Written opinion dated Jul. 18, 2016 for PCT/CN2015/091987.

* cited by examiner

*Primary Examiner* — Elizabeth A. Bolden

(74) *Attorney, Agent, or Firm* — Anova Law Group, PLLC

(57) ABSTRACT

A composition for producing a glass fiber, including the following components with the corresponding percentage amounts by weight: $SiO_2$: 58-62%; $Al_2O_3$: 14-18%; CaO+MgO: 20-24.5%; CaO: greater than 14%; $Li_2O$: 0.01-0.5%; $Na_2O+K_2O$: less than 2%; $TiO_2$: less than 3.5%; $Fe_2O_3$: less than 1%; and $F_2$: less than 1%. The weight percentage ratio of CaO/MgO is greater than 2 and less than or equal to 2.6; and the weight percentage ratio $SiO_2$/CaO is between 3.3 and 4.3. The invention also provides a glass fiber produced using the composition and a composite material including the glass fiber.

20 Claims, No Drawings

GLASS FIBER, COMPOSITION FOR PRODUCING THE SAME, AND COMPOSITE MATERIAL COMPRISING THE SAME

CROSS-REFERENCE TO RELATED APPLICATIONS

This application is a continuation-in-part of International Patent Application No. PCT/CN2015/091987 with an international filing date of Oct. 15, 2015, designating the United States, the contents of which, including any intervening amendments thereto, are incorporated herein by reference.

BACKGROUND OF THE INVENTION

Field of the Invention

The invention relates to a glass fiber, a composition for producing the same, and a composite material comprising the same.

Description of the Related Art

Conventional glass fibers face production problems due to high liquidus temperature, high risk of devitrification, high forming temperature, high surface tension and fining difficulty of molten glass. The liquidus temperature of the mainstream E-glass is generally less than 1200° C., and its forming temperature is lower than 1300° C., while the above-mentioned high-performance glass fibers generally have liquidus temperatures higher than 1300° C. and forming temperatures higher than 1350° C. This often leads to the glass crystallization phenomenon, uneven viscosity and poor fining, greatly reducing the production efficiency, product quality and the service life of refractory materials and platinum bushings.

SUMMARY OF THE INVENTION

It is one objective of the present disclosure to provide a composition for producing glass fiber, as well as a glass fiber and composite material made therefrom.

To achieve the above objective, in accordance with one embodiment of the present disclosure, there is provided a composition for producing glass fiber, the composition comprising percentage amounts by weight of:

| | |
|---|---|
| $SiO_2$ | 58-62%; |
| $Al_2O_3$ | 14-18%; |
| $CaO + MgO$ | 20-24.5%; |
| $CaO$ | greater than 14%; |
| $Li_2O$ | 0.01-0.5%; |
| $Na_2O + K_2O$ | less than 2%; |
| $TiO_2$ | less than 3.5%; |
| $Fe_2O_3$ | less than 1%; and |
| $F_2$ | less than 1%; | where, a weight percentage ratio of CaO/MgO is greater than 2 and less than or equal to 2.6, and a weight percentage ratio of $SiO_2$/CaO is between 3.3 and 4.3.

In a class of this embodiment, the content of $F_2$ expressed as weight percentage is greater than or equal to 0.01% and less than 0.3%.

In a class of this embodiment, the content of $Li_2O$ expressed as weight percentage is greater than or equal to 0.01% and less than 0.1%.

In a class of this embodiment, the composition for producing glass fiber can further comprise $B_2O_3$, and the content of $B_2O_3$ expressed as weight percentage is greater than 0% and less than 0.1%.

According to another aspect of this invention, there is provided a glass fiber which is produced using the composition.

According to yet another aspect of this invention, a composite material comprising the glass fiber is provided.

By strictly controlling the ranges of contents of $SiO_2$, CaO, MgO, $Li_2O$ and $F_2$ respectively, strictly controlling the ranges of the ratios of CaO/MgO and $SiO_2$/CaO, making full use of the ternary mixed alkali effect of $K_2O$, $Na_2O$ and $Li_2O$, and selectively introducing a small amount of $B_2O_3$, the technical solutions of the present invention can not only ensure that the glass fiber made therefrom has advantageous mechanical properties, but also solve the problems in the production of high-performance glass fiber, due to high liquidus temperature, high crystallization rate, high forming temperature, cooling difficulty, high surface tension and fining difficulty. The composition can significantly reduce forming temperature, liquidus temperature and surface tension of molten glass, and reduce the fiberizing difficulty, devitrification degree and the bubble amount under the same conditions. Meanwhile, the glass fiber made therefrom possesses favorable mechanical strength. Additionally, said glass fiber would possess exceptional heat resistance property when a high content of $TiO_2$ is introduced.

Specifically, the composition for producing glass fiber according to the present invention comprises the following components expressed as percentage amounts by weight:

| | |
|---|---|
| $SiO_2$ | 58-62%; |
| $Al_2O_3$ | 14-18%; |
| $CaO + MgO$ | 20-24.5%; |
| $CaO$ | greater than 14%; |
| $Li_2O$ | 0.01-0.5%; |
| $Na_2O + K_2O$ | less than 2%; |
| $TiO_2$ | less than 3.5%; |
| $Fe_2O_3$ | less than 1%; and |
| $F_2$ | less than 1%; | where, the weight percentage ratio C1=CaO/MgO is greater than 2 and less than or equal to 2.6, and the range of the weight percentage ratio C2=$SiO_2$/CaO is 3.3-4.3.

The effect and content of each component in said composition for producing glass fiber is described as follows:

$SiO_2$ is a main oxide forming the glass network and has the effect of stabilizing all the components. In the composition for producing glass fiber of the present invention, the restricted content range of $SiO_2$ is 58-62% by weight. $SiO_2$ content being too low will affect the mechanical properties of the glass; $SiO_2$ content being too high will cause the glass viscosity to be excessively high thereby resulting in melting and fining issues. Preferably, the $SiO_2$ content range can be 58.5-61% by weight. More preferably, the $SiO_2$ content range can be 58.5-60.4% by weight.

$Al_2O_3$ is another oxide forming the glass network. When combined with $SiO_2$, it can have a substantive effect on the mechanical properties of the glass and a significant effect on preventing glass phase separation and on water resistance. The restricted content range of $Al_2O_3$ in the composition for producing glass fiber of this invention is 14-18% by weight. $Al_2O_3$ content being too low will be unable to obtain high mechanical properties; $Al_2O_3$ content being too high will cause the glass viscosity to be excessively high thereby resulting in melting and fining issues. Preferably, the $Al_2O_3$ content can be 14.5-17% by weight. More preferably, the $Al_2O_3$ content can be 14.5-16.5% by weight.

CaO is an important glass network modifier and has a particular effect in reducing glass viscosity at high temperature, but the CaO content being too high will cause higher crystallization tendency of glass, thereby resulting in the crystallization of anorthite ($CaAl_2Si_2O_8$) and wollastonite ($CaSiO_3$) from the glass melt. MgO has the similar effect, and the $Mg^{2+}$ has higher field strength and plays a significant role in increasing the modulus of glass. MgO content being too high will increase the tendency and rate of the glass crystallization, thus causing the risk of diopside ($CaMgSi_2O_6$) crystallization. By reasonably designing the content ranges of CaO, MgO, $SiO_2$ and the ratios therebetween, the present invention succeeds in introducing a competitive growth in crystals of anorthite ($CaAl_2Si_2O_8$), diopside ($CaMgSi_2O_6$) and wollastonite ($CaSiO_3$) so as to retard the growth of these crystals, thus reducing the risk of devitrification. In the composition for producing glass fiber of this invention, the restricted range of the total content of CaO and MgO is 20-24.5% by weight, where, the weight percentage ratio C1=CaO/MgO is greater than 2 and less than or equal to 2.6, and the range of the weight percentage ratio C2=$SiO_2$/CaO is 3.3-4.3. The crystallization of glass could be controlled by making full use of the competition of $Mg^{2+}$, $Ca^{2+}$ and $Si^{4+}$ in grabbing the anion groups in the glass, thereby reducing the liquidus temperature and the degree of devitrification. Obviously, the weight percent ratio of CaO/MgO being too low will cause too much content of $Mg^{2+}$, and aggravate the crystallization of diopside; the weight percent ratio of CaO/MgO being too high will cause too much content of $Ca^{2+}$, and aggravate the crystallization of anorthite; the weight percent ratio of $SiO_2$/CaO being too high will cause higher viscosity; the weight percent ratio of $SiO_2$/CaO being too low will aggravate the crystallization of wollastonite. Preferably, the range of the weight percentage ratio C1=CaO/MgO is greater than 2 and less than or equal to 2.4, and the range of the weight percentage ratio C2=$SiO_2$/CaO is 3.4-4.2. More preferably, the range of the weight percentage ratio C2=$SiO_2$/CaO is 3.5-4.0.

Both $K_2O$ and $Na_2O$ are good fluxing agents that can reduce glass viscosity and improve crystallization properties of the glass. But the added amounts of them should not be too high so as not to reduce the glass strength. In the composition for producing glass fiber of this invention, the restricted range of the total content of $Na_2O$ and $K_2O$ is less than 2% by weight.

$TiO_2$ can not only reduce the glass viscosity at high temperature, but also has a certain fluxing effect. Meanwhile, high content of $TiO_2$ greatly helps to improve the heat resistance of the glass. Therefore, in the composition for producing glass fiber of this invention, the restricted range of the content of $TiO_2$ is less than 3.5% by weight. Furthermore, the inventors have found that, the glass would possess exceptional heat resistance when the range of the content of $TiO_2$ is set to be greater than 2% and less than 3.5% by weight.

The introduction of $Fe_2O_3$ facilitates the melting of glass and can also improve the crystallization properties of glass. However, since ferric ions and ferrous ions have coloring effects, the introduced amount should be limited. Therefore, in the composition for producing glass fiber of the present invention, the restricted range of the content of $Fe_2O_3$ is less than 1% by weight.

$Li_2O$ can not only reduce the glass viscosity dramatically to improve melting performance, but also obviously help to improve mechanical properties, compared with $Na_2O$ and $K_2O$. In addition, a small amount of $Li_2O$ can provide considerable free oxygen, thereby promoting more aluminum ions to form tetrahedral coordination that would help strengthen the glass network and further reduce crystallization tendency of glass. But the added amount of $Li_2O$ should not be too high, as the content of $Li^+$ being too high will have a significant effect in disrupting the glass network, affect the stability of glass structure, and thus increase the crystallization tendency of glass. Therefore, in the composition for producing glass fiber of the present invention, the restricted range of the content of $Li_2O$ is 0.01-0.5% by weight. The inventors have found that, the technical effects remain excellent even when the content of $Li_2O$ is kept relatively low, such as greater than or equal to 0.01% and less than 0.1% by weight.

Fluorine ($F_2$) could be added in small amounts in the composition for producing glass fiber of the present invention. A great amount of experiments and researches show that a small amount of fluorine offers a significant improvement in fluxing performance and reduction of forming temperature and liquidus temperature, while causing little difficulty in waste gas treatment. For example, the weight percent of $F_2$ being 0.2% can reduce the forming temperature and liquidus temperature by 4-6, which is favorable to the fiber attenuation of high performance glass. Therefore, in the composition for producing glass fiber of the present invention, the restricted range of the content of $Li_2O$ is less than 1% by weight. Generally, the content range of $F_2$ is restricted to be greater than or equal to 0.01% and less than 0.3%, considering that a relatively low content of $F_2$ can still produce a desired effect.

Additionally, a small amount of $B_2O_3$ can be selectively introduced, which has fluxing effect and can reduce the glass viscosity and devitrification risk. Unexpectedly, the inventors have found that $B_2O_3$ can further improve strength, modulus and other physical properties of glass when it coexists with $Li_2O$ in the glass composition of the present invention. This is perhaps because, in the inventors' view, the small amount of $B_2O_3$ have all actively entered the glass structure, which is favorable in optimizing the glass properties. Therefore, in the composition for producing glass fiber of the present invention, the restricted range of the content of $B_2O_3$ is greater than 0% and less than 0.1% by weight.

In addition to aforementioned components, small amount of impurities may be present in the glass composition according to the present invention, and the total weight percentage of the impurities is less than or equal to 1%.

In the composition for producing glass fiber of the present invention, the beneficial effects produced by the aforementioned selected ranges of the components will be explained through the specific experimental data provided below.

The following are examples of preferred content ranges of the components comprised in the composition for producing glass fiber according to the present invention.

Preferably, the composition for producing glass fiber according to the present invention comprises the following components expressed as percentage amounts by weight:

| | |
|---|---|
| $SiO_2$ | 58.5-61%; |
| $Al_2O_3$ | 14.5-17%; |
| CaO + MgO | 20-24.5%; |
| CaO | greater than 14%; |
| $Li_2O$ | 0.01-0.5%; |
| $Na_2O$ + $K_2O$ | less than 2%; |

-continued

| | |
|---|---|
| $TiO_2$ | less than 3.5%; |
| $Fe_2O_3$ | less than 1%; and |
| $F_2$ | less than 1%; | where, the range of the weight percentage ratio C1=CaO/MgO is greater than 2 and less than or equal to 2.4; and the range of the weight percentage ratio C2=SiO$_2$/CaO is 3.4-4.2.

Preferably, the composition for producing glass fiber according to the present invention comprises the following components expressed as percentage amounts by weight:

| | |
|---|---|
| $SiO_2$ | 58.5-60.4%; |
| $Al_2O_3$ | 14.5-16.5%; |
| CaO + MgO | 20-24.5%; |
| CaO | greater than 14%; |
| $Li_2O$ | 0.01-0.5%; |
| $Na_2O + K_2O$ | less than 2%; |
| $TiO_2$ | less than 3.5%; |
| $Fe_2O_3$ | less than 1%; |
| $F_2$ | less than 1%; and |
| $B_2O_3$ | greater than 0% and less than 0.1%; | where, the range of the weight percentage ratio C1=CaO/MgO is greater than 2 and less than or equal to 2.4; and the range of the weight percentage ratio C2=SiO$_2$/CaO is 3.5-4.0.

Preferably, the composition for producing glass fiber according to the present invention comprises the following components expressed as percentage amounts by weight:

| | |
|---|---|
| $SiO_2$ | 58-62%; |
| $Al_2O_3$ | 14-18%; |
| CaO + MgO | 20-24.5%; |
| CaO | greater than 14%; |
| $Li_2O$ | 0.01-0.5%; |
| $Na_2O + K_2O$ | less than 2%; |
| $TiO_2$ | greater than 2% and less than 3.5%; |
| $Fe_2O_3$ | less than 1%; and |
| $F_2$ | less than 1%; | where, the range of the weight percentage ratio C1=CaO/MgO is greater than 2 and less than or equal to 2.6; and the range of the weight percentage ratio C2=SiO$_2$/CaO is 3.3-4.3.

The present invention provides a high performance composition for producing glass fiber, glass fiber and composite material therefrom. The composition can not only ensure that the glass fiber made therefrom has high mechanical properties, but also solve the problems in the production of high-performance glass fiber, such as high liquidus temperature, high crystallization rate, high forming temperature, cooling difficulty, high surface tension and fining difficulty. The composition can significantly reduce forming temperature, liquidus temperature and surface tension of molten glass, and reduce the fiberizing difficulty, devitrification degree and the bubble amount under the same conditions. Meanwhile, the glass fiber made therefrom possesses favorable mechanical strength.

DESCRIPTION OF PREFERRED EMBODIMENTS

In order to better clarify the purposes, technical solutions and advantages of the examples of the present invention, the technical solutions in the examples of the present invention are clearly and completely described below combined with the drawings in the examples. Obviously, the examples described herein are just part of the examples of the present invention and are not all the examples. All other exemplary embodiments obtained by one skilled in the art on the basis of the examples in the present invention without performing creative work shall all fall into the scope of protection of the present invention. What needs to be made clear is that, as long as there is no conflict, the examples and the features of examples in the present application can be arbitrarily combined with each other.

The basic concept of the present invention is that, the composition for producing glass fiber comprises the following components expressed as percentage amounts by weight: SiO$_2$ 58-62%, Al$_2$O$_3$ 14-18%, CaO+MgO 20-24.5%, CaO greater than 14%, Li$_2$O 0.01-0.4%, Na$_2$O+K$_2$O less than 2%, TiO$_2$ less than 3.5%, Fe$_2$O$_3$ less than 1%, F$_2$ less than 1%, the range of the weight percentage ratio C1=CaO/MgO is greater than 2 and less than or equal to 2.6, and the range of the weight percentage ratio C2=SiO$_2$/CaO is 3.3-4.3. In addition, the composition for producing glass fiber can comprise a small amount of B$_2$O$_3$, and the content of B$_2$O$_3$ expressed as weight percentage is greater than 0% and less than 0.1%. The composition for producing glass fiber in the present invention can not only ensure that the glass fiber made therefrom has high mechanical properties, but also solve the problems in the production of high-performance glass fiber, such as high liquidus temperature, high crystallization rate, high forming temperature, cooling difficulty, high surface tension, fining difficulty and difficulty in large-scale industrial production. The composition can significantly reduce forming temperature, liquidus temperature, and surface tension of molten glass, and reduce the fiberizing difficulty, devitrification degree and the bubble amount under the same conditions. Meanwhile, the glass fiber made therefrom possesses a favorable mechanical strength. Additionally, said glass fiber would possess exceptional heat resistance property when a high content of TiO$_2$ is introduced.

In accordance with the specific embodiments mentioned, the specific content values of SiO$_2$, Al$_2$O$_3$, CaO, MgO, Na$_2$O, K$_2$O, Fe$_2$O$_3$, Li$_2$O, TiO$_2$ and B$_2$O$_3$ in the composition for producing glass fiber of the present invention are selected to be used in the examples, which are compared with the properties of traditional E and R glasses and improved R glass in terms of the following six property parameters:

(1) Forming temperature, the temperature at which the glass melt has a viscosity of 10$^3$ poise.

(2) Liquidus temperature, the temperature at which the crystal nucleuses begin to form when the glass melt cools off, i.e., the upper limit temperature for glass crystallization.

(3) ΔT value, which is the temperature differential between the forming temperature and the liquidus temperature and indicates the temperature range at which fiber drawing can be performed.

(4) Crystallization peak temperature, the temperature of the strongest crystallization peak in the DTA (Differential Thermal Analysis) test. Generally, the higher the temperature is, the more energy that the crystal nucleuses to be growing up needs, and the smaller crystallization tendency of glass is.

(5) Filament strength, the tensile strength that a filament of glass fiber strand can withstand.

(6) Softening point temperature, which is a measurement of the ability of glass to resist high temperature deformation.

The aforementioned six parameters and the methods of measuring them are well-known to one skilled in the art. Therefore, the aforementioned parameters can be effectively used to explain the properties of the composition for producing glass fiber of the present invention.

The specific procedures for the experiments are as follows: Each component can be acquired from the appropriate raw materials; the raw materials are mixed in the appropriate proportions so that each component reaches the final expected weight percentage; the mixed batch is melted and clarified; then the molten glass is drawn out through the tips of the bushings, thereby forming the glass fiber; the glass fiber is attenuated onto the rotary collet of a winder to form cakes or packages. Of course, conventional methods can be used to deeply process these glass fibers to meet the expected requirements.

The exemplary embodiments of the composition for producing glass fibers according to the present invention are given below.

Example 1

| | |
|---|---|
| $SiO_2$ | 58% |
| $Al_2O_3$ | 18% |
| CaO | 14.1% |
| MgO | 6.9% |
| $B_2O_3$ | — |
| $Li_2O$ | 0.01% |
| $Na_2O$ | 0.51% |
| $K_2O$ | 0.28% |
| $Fe_2O_3$ | 0.69% |
| $TiO_2$ | 0.61% |
| $F_2$ | 90% | where, the weight percentage ratio C1=CaO/MgO is 2.04; and the weight percentage ratio C2=$SiO_2$/CaO is 4.11.

In Example 1, the measured values of the six parameters are respectively:

| | |
|---|---|
| Forming temperature | 1271° C. |
| Liquidus temperature | 1187° C. |
| ΔT | 84° C. |
| Crystallization peak temperature | 1042° C. |
| Filament strength | 4115 MPa |
| Softening point temperature | 915° C. |

Example 2

| | |
|---|---|
| $SiO_2$ | 62% |
| $Al_2O_3$ | 14% |
| CaO | 15.6% |
| MgO | 6.0% |
| $B_2O_3$ | — |
| $Li_2O$ | 0.05% |
| $Na_2O$ | 0.01% |
| $K_2O$ | 1.88% |
| $Fe_2O_3$ | 0.40% |
| $TiO_2$ | 0.04% |
| $F_2$ | 0.02% | where, the weight percentage ratio C1=CaO/MgO is 2.60; and the weight percentage ratio C2=$SiO_2$/CaO is 3.97.

In Example 2, the measured values of the six parameters are respectively:

| | |
|---|---|
| Forming temperature | 1277° C. |
| Liquidus temperature | 1195° C. |
| ΔT | 82° C. |
| Crystallization peak temperature | 1034° C. |
| Filament strength | 4195 MPa |
| Softening point temperature | 920° C. |

Example 3

| | |
|---|---|
| $SiO_2$ | 59.4% |
| $Al_2O_3$ | 14.5% |
| CaO | 16.5% |
| MgO | 6.875% |
| $B_2O_3$ | — |
| $Li_2O$ | 0.03% |
| $Na_2O$ | 0.12% |
| $K_2O$ | 1.175% |
| $TiO_2$ | 1.29% |
| $Fe_2O_3$ | 0.05% |
| $F_2$ | 0.06% | where, the weight percentage ratio C1=CaO/MgO is 2.4; and the weight percentage ratio C2=$SiO_2$/CaO is 3.60.

In Example 3, the measured values of the six parameters are respectively:

| | |
|---|---|
| Forming temperature | 1265° C. |
| Liquidus temperature | 1187° C. |
| ΔT | 78° C. |
| Crystallization peak temperature | 1043° C. |
| Filament strength | 4149 MPa |
| Softening point temperature | 916° C. |

Example 4

| | |
|---|---|
| $SiO_2$ | 61% |
| $Al_2O_3$ | 17% |
| CaO | 14.2% |
| MgO | 5.8% |
| $B_2O_3$ | — |
| $Li_2O$ | 0.01% |
| $Na_2O$ | 0.21% |
| $K_2O$ | 0.15% |
| $Fe_2O_3$ | 0.99% |
| $TiO_2$ | 0.32% |
| $F_2$ | 0.32% | where, the weight percentage ratio C1=CaO/MgO is 2.45; and the weight percentage ratio C2=$SiO_2$/CaO is 4.30.

In Example 4, the measured values of the six parameters are respectively:

| | |
|---|---|
| Forming temperature | 1278° C. |
| Liquidus temperature | 1196° C. |
| ΔT | 82° C. |
| Crystallization peak temperature | 1030° C. |
| Filament strength | 4216 MPa |
| Softening point temperature | 920° C. |

Example 5

| | |
|---|---|
| SiO$_2$ | 58.5% |
| Al$_2$O$_3$ | 16.5% |
| CaO | 14.5% |
| MgO | 7% |
| B$_2$O$_3$ | — |
| Li$_2$O | 0.5% |
| Na$_2$O | 0.5% |
| K$_2$O | 0.15% |
| Fe$_2$O$_3$ | 0.35% |
| TiO$_2$ | 1.8% |
| F$_2$ | 0.2% | where, the weight percentage ratio C1=CaO/MgO is 2.07; and the weight percentage ratio C2=SiO$_2$/CaO is 4.03.

In Example 5, the measured values of the six parameters are respectively:

| | |
|---|---|
| Forming temperature | 1264° C. |
| Liquidus temperature | 1190° C. |
| ΔT | 74° C. |
| Crystallization peak temperature | 1040° C. |
| Filament strength | 4147 MPa |
| Softening point temperature | 922° C. |

Example 6

| | |
|---|---|
| SiO$_2$ | 58.625% |
| Al$_2$O$_3$ | 14.375% |
| CaO | 16.75% |
| MgO | 7.75% |
| B$_2$O$_3$ | — |
| Li$_2$O | 0.15% |
| Na$_2$O | 0.1% |
| K$_2$O | 0.02% |
| Fe$_2$O$_3$ | 0.02% |
| TiO$_2$ | 2.06% |
| F$_2$ | 0.15% | where, the weight percentage ratio C1=CaO/MgO is 2.16; and the weight percentage ratio C2=SiO$_2$/CaO is 3.50.

In Example 6, the measured values of the six parameters are respectively:

| | |
|---|---|
| Forming temperature | 1269° C. |
| Liquidus temperature | 1190° C. |
| ΔT | 79° C. |
| Crystallization peak temperature | 1040° C. |
| Filament strength | 4124 MPa |
| Softening point temperature | 925° C. |

Example 7

| | |
|---|---|
| SiO$_2$ | 60.4% |
| Al$_2$O$_3$ | 15% |
| CaO | 15.1% |
| MgO | 6.25% |
| B$_2$O$_3$ | — |
| Li$_2$O | 0.01% |
| Na$_2$O | 0.5% |
| K$_2$O | 0.8% |
| Fe$_2$O$_3$ | 0.2% |
| TiO$_2$ | 1.24% |
| F$_2$ | 0.5% | where, the weight percentage ratio C1=CaO/MgO is 2.42; and the weight percentage ratio C2=SiO$_2$/CaO is 4.00.

In Example 7, the measured values of the six parameters are respectively:

| | |
|---|---|
| Forming temperature | 1273° C. |
| Liquidus temperature | 1196° C. |
| ΔT | 77° C. |
| Crystallization peak temperature | 1030° C. |
| Filament strength | 4130 MPa |
| Softening point temperature | 915° C. |

Example 8

| | |
|---|---|
| SiO$_2$ | 58.48% |
| Al$_2$O$_3$ | 14% |
| CaO | 17.2% |
| MgO | 6.2% |
| B$_2$O$_3$ | 0.08% |
| Li$_2$O | 0.5% |
| Na$_2$O | 0.5% |
| K$_2$O | 0.25% |
| Fe$_2$O$_3$ | 0.5% |
| TiO$_2$ | 1.79% |
| F$_2$ | 0.5% | where, the weight percentage ratio C1=CaO/MgO is 2.29; and the weight percentage ratio C2=SiO$_2$/CaO is 3.40.

In Example 8, the measured values of the six parameters are respectively:

| | |
|---|---|
| Forming temperature | 1260° C. |
| Liquidus temperature | 1182° C. |
| ΔT | 78° C. |
| Crystallization peak temperature | 1044° C. |
| Filament strength | 4110 MPa |
| Softening point temperature | 914° C. |

Example 9

| | |
|---|---|
| SiO$_2$ | 59.5% |
| Al$_2$O$_3$ | 14% |
| CaO | 17.5% |
| MgO | 7% |
| Li$_2$O | 0.08% |
| Na$_2$O | 0.41% |
| K$_2$O | 0.51% |
| Fe$_2$O$_3$ | 0.5% |
| TiO$_2$ | 0.3% |
| F$_2$ | 0.2% | where, the weight percentage ratio C1=CaO/MgO is 2.50; and the weight percentage ratio C2=SiO$_2$/CaO is 3.40.

In Example 9, the measured values of the six parameters are respectively:

| Forming temperature | 1272° C. |
|---|---|
| Liquidus temperature | 1194° C. |
| ΔT | 78° C. |
| Crystallization peak temperature | 1032° C. |
| Filament strength | 4132 MPa |
| Softening point temperature | 912° C. |

Example 10

| SiO$_2$ | 60.9% |
|---|---|
| Al$_2$O$_3$ | 15.2% |
| CaO | 14.5% |
| MgO | 7.1% |
| B$_2$O$_3$ | 0.01% |
| Li$_2$O | 0.14% |
| Na$_2$O | 0.41% |
| K$_2$O | 0.33% |
| Fe$_2$O$_3$ | 0.41% |
| TiO$_2$ | 1.00% |
| F$_2$ | — | where, the weight percentage ratio C1=CaO/MgO is 2.05; and the weight percentage ratio C2=SiO$_2$/CaO is 4.20.

In Example 10, the measured values of the six parameters are respectively:

| Forming temperature | 1274° C. |
|---|---|
| Liquidus temperature | 1194° C. |
| ΔT | 80° C. |
| Crystallization peak temperature | 1034° C. |
| Filament strength | 4137 MPa |
| Softening point temperature | 923° C. |

Example 11

| SiO$_2$ | 60.1% |
|---|---|
| Al$_2$O$_3$ | 15.2% |
| CaO | 15.1% |
| MgO | 7.5% |
| B$_2$O$_3$ | — |
| Li$_2$O | 0.50% |
| Na$_2$O | 0.44% |
| K$_2$O | 0.28% |
| Fe$_2$O$_3$ | 0.42% |
| TiO$_2$ | 0.28% |
| F$_2$ | — | where, the weight percentage ratio C1=CaO/MgO is 2.02; and the weight percentage ratio C2=SiO$_2$/CaO is 3.99.

In Example 11, the measured values of the six parameters are respectively:

| Forming temperature | 1274° C. |
|---|---|
| Liquidus temperature | 1193° C. |
| ΔT | 81° C. |
| Crystallization peak temperature | 1036° C. |
| Filament strength | 4156 MPa |
| Softening point temperature | 920° C. |

Comparisons of the property parameters of the aforementioned examples and other examples of the composition for producing glass fiber of the present invention with those of the traditional E glass, traditional R glass and improved R glass are further made below by way of tables, where the component contents of the composition for producing glass fiber are expressed as weight percentage. What needs to be made clear is that the total amount of the components in the examples is slightly less than 100%, and it should be understood that the remaining amount is trace impurities or a small amount of components which cannot be analyzed.

TABLE 1

| | | A1 | A2 | A3 | A4 | A5 | A6 | A7 |
|---|---|---|---|---|---|---|---|---|
| Component | SiO$_2$ | 59.4 | 59.5 | 60.4 | 60.0 | 60.1 | 59.2 | 59.7 |
| | Al$_2$O$_3$ | 15.2 | 15.4 | 15.5 | 15.3 | 16.5 | 15.0 | 15.5 |
| | CaO | 16.6 | 16.1 | 14.8 | 14.05 | 14.1 | 16.1 | 15.5 |
| | MgO | 6.8 | 7.0 | 7.0 | 6.7 | 7.0 | 8.0 | 7.2 |
| | B$_2$O$_3$ | — | 0.05 | 0.05 | — | — | — | — |
| | Na$_2$O | 0.51 | 0.51 | 0.51 | 0.61 | 0.48 | 0.43 | 0.51 |
| | K$_2$O | 0.28 | 0.28 | 0.28 | 0.21 | 0.35 | 0.31 | 0.28 |
| | Li$_2$O | 0.09 | 0.20 | 0.40 | 0.15 | 0.41 | 0.04 | 0.25 |
| | Fe$_2$O$_3$ | 0.41 | 0.41 | 0.41 | 0.41 | 0.41 | 0.42 | 0.41 |
| | TiO$_2$ | 0.31 | 0.35 | 0.30 | 2.37 | 0.45 | 0.25 | 0.35 |
| | F$_2$ | 0.20 | — | 0.15 | — | — | 0.05 | 0.10 |
| Ratio | C1 | 2.45 | 2.30 | 2.12 | 2.10 | 2.02 | 2.02 | 2.16 |
| | C2 | 3.58 | 3.70 | 4.09 | 4.28 | 4.27 | 3.68 | 3.86 |
| Parameter | Forming temperature/° C. | 1274 | 1276 | 1275 | 1274 | 1277 | 1271 | 1273 |
| | Liquidus temperature/° C. | 1195 | 1194 | 1194 | 1193 | 1195 | 1192 | 1194 |
| | ΔT/° C. | 79 | 82 | 81 | 81 | 82 | 79 | 79 |
| | Crystallization peak temperature/° C. | 1031 | 1034 | 1033 | 1035 | 1032 | 1039 | 1034 |
| | Filament strength/MPa | 4145 | 4149 | 4142 | 4148 | 4153 | 4146 | 4135 |
| | Softening point temperature/° C. | 919 | 918 | 921 | 930 | 920 | 917 | 918 |

TABLE 2

| | A8 | A9 | A10 | A11 | Traditional E glass | Traditional R glass | Improved R glass |
|---|---|---|---|---|---|---|---|
| Component $SiO_2$ | 59.0 | 60.5 | 59.6 | 60.1 | 54.16 | 60 | 60.75 |
| $Al_2O_3$ | 16.0 | 15.2 | 15.7 | 15.2 | 14.32 | 25 | 15.80 |
| CaO | 15.4 | 14.5 | 15.5 | 15.1 | 22.12 | 9 | 13.90 |
| MgO | 7.5 | 7.1 | 7.2 | 7.5 | 0.41 | 6 | 7.90 |
| $B_2O_3$ | — | 0.01 | — | — | 7.6 | — | — |
| $Na_2O$ | 0.50 | 0.45 | 0.56 | 0.44 | 0.45 | trace amount | 0.73 |
| $K_2O$ | 0.26 | 0.33 | 0.25 | 0.28 | 0.25 | trace amount | — |
| $Li_2O$ | 0.30 | 0.14 | 0.19 | 0.50 | 0 | 0 | 0.48 |
| $Fe_2O_3$ | 0.40 | 0.41 | 0.41 | 0.42 | 0.35 | trace amount | 0.18 |
| $TiO_2$ | 0.34 | 1.05 | 0.34 | 0.26 | 0.34 | trace amount | 0.12 |
| $F_2$ | 0.10 | — | 0.15 | — | >0.4 | — | — |
| Ratio C1 | 2.06 | 2.05 | 2.16 | 2.02 | 53.96 | 1.50 | 1.76 |
| C2 | 3.84 | 4.18 | 3.85 | 3.99 | 2.45 | 6.67 | 4.38 |
| Parameter Forming temperature/° C. | 1273 | 1274 | 1275 | 1274 | 1175 | 1430 | 1278 |
| Liquidus temperature/° C. | 1192 | 1194 | 1195 | 1193 | 1075 | 1350 | 1210 |
| ΔT/° C. | 81 | 80 | 80 | 81 | 100 | 80 | 68 |
| Crystallization peak temperature/° C. | 1038 | 1034 | 1033 | 1036 | / | 1010 | 1016 |
| Filament strength/MPa | 4134 | 4137 | 4128 | 4156 | 3265 | 4220 | 4089 |
| Softening point temperature/° C. | 918 | 923 | 919 | 920 | 835 | 923 | 912 |

It can be seen from the values in the above tables that, compared with the traditional R glass and improved R glass, the composition for producing glass fiber of the present invention has the following advantages: (1) The composition has much lower liquidus temperature, which helps to reduce crystallization risk and increase the fiber drawing efficiency. (2) The composition has higher crystallization peak temperature, which means more energy is needed for the crystal nucleuses to grow, that is to say, the composition has lower crystallization risk under the same condition. (3) The composition has lower forming temperature. Meanwhile, the composition has higher filament strength and softening point temperature compared with the improved R glass. It can be seen that, compared with the improved R glass, the composition for producing glass fiber of the present invention makes a breakthrough in crystallization performance, filament strength and heat resistance, and greatly reduces crystallization risk, significantly improves the filament strength and softening point temperature under the same conditions, and the cost-performance ratio of the entire technical solutions is higher, thereby making it more suitable for large-scale tank furnace production.

The composition for producing glass fiber according to the present invention can be used for making glass fibers having the aforementioned excellent properties.

The composition for producing glass fiber according to the present invention can be used in combination with one or more organic and/or inorganic materials for preparing composite materials having excellent performances, such as glass fiber reinforced base materials.

In conclusion, the present invention provides a composition for producing glass fiber, glass fiber and composite material therefrom. The composition can not only ensure that the glass fiber made therefrom has high mechanical properties, but also solve the problems in the production of high-performance glass fiber, such as high liquidus temperature, high crystallization rate, high forming temperature, cooling difficulty, high surface tension and fining difficulty. The composition can significantly reduce forming temperature, liquidus temperature and surface tension of molten glass, and reduce the fiberizing difficulty, devitrification degree and the bubble amount under the same conditions. Meanwhile, the glass fiber made therefrom possesses favorable mechanical strength.

Finally, what should be made clear is that, in this text, the terms "contain", "comprise" or any other variants are intended to mean "nonexclusively include" so that any process, method, article or equipment that contains a series of factors shall include not only such factors, but also include other factors that are not explicitly listed, or also include intrinsic factors of such process, method, object or equipment. Without more limitations, factors defined by the phrase "contain a . . . " or its variants do not rule out that there are other same factors in the process, method, article or equipment which include said factors.

The composition for producing glass fiber of the present invention makes a breakthrough in crystallization properties, filament strength and heat resistance of the glass compared with the improved R glass, and greatly reduces crystallization risk, and significantly improves the filament strength and softening point temperature under the same conditions, and the cost-performance ratio of the entire technical solutions is higher, thereby making it more suitable for large-scale tank furnace production.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A composition for producing a glass fiber, comprising the following components with corresponding percentage amounts by weight:

| | |
|---|---|
| $SiO_2$ | 58-62%; |
| $Al_2O_3$ | 14-18%; |
| CaO + MgO | 20-24.5%; |
| CaO | greater than 14%; |
| $Li_2O$ | 0.01-0.5%; |
| $Na_2O + K_2O$ | less than 2%; |
| $TiO_2$ | less than 3.5%; |
| $Fe_2O_3$ | greater than or equal to 0.41% and less than 1%; and |
| $F_2$ | greater than or equal to 0.05% and less than 1%; | wherein
a weight percentage ratio of CaO/MgO is greater than 2 and less than or equal to 2.6; and
a weight percentage ratio $SiO_2$/CaO is 3.3-4.3.

2. The composition of claim 1, comprising greater than or equal to 0.05% and less than 0.3% by weight of $F_2$.

3. The composition of claim 1, comprising greater than or equal to 0.01% and less than 0.1% by weight of $Li_2O$.

4. The composition of claim 1, wherein the weight percentage ratio $SiO_2$/CaO is between 3.4-4.2.

5. The composition of claim 1, comprising greater than 2% and less than 3.5% by weight of $Ti_2O$.

6. The composition of claim 1, further comprising greater than 0% and less than 0.1% by weight of $B_2O_3$.

7. The composition of claim 6, comprising greater than or equal to 0.05% and less than 0.3% by weight of $F_2$.

8. The composition of claim 6, comprising greater than or equal to 0.01% and less than 0.1% by weight of $Li_2O$.

9. The composition of claim 1, comprising the following components with corresponding percentage amounts by weight:

| | |
|---|---|
| $SiO_2$ | 58.5-61%; |
| $Al_2O_3$ | 14.5-17%; |
| CaO + MgO | 20-24.5%; |
| CaO | greater than 14%; |
| $Li_2O$ | 0.01-0.5%; |
| $Na_2O + K_2O$ | less than 2%; |
| $TiO_2$ | less than 3.5%; |
| $Fe_2O_3$ | greater than or equal to 0.41% and less than 1%; and |
| $F_2$ | greater than or equal to 0.05% and less than 1%; | wherein
the weight percentage ratio of CaO/MgO is greater than 2 and less than or equal to 2.4; and
a weight percentage ratio $SiO_2$/CaO is 3.4-4.2.

10. The composition of claim 1, comprising the following components with corresponding percentage amounts by weight:

| | |
|---|---|
| $SiO_2$ | 58.5-60.4%; |
| $Al_2O_3$ | 14.5-16.5%; |
| CaO + MgO | 20-24.5%; |
| CaO | greater than 14%; |
| $Li_2O$ | 0.01-0.5%; |
| $Na_2O + K_2O$ | less than 2%; |
| $TiO_2$ | less than 3.5%; |
| $Fe_2O_3$ | greater than or equal to 0.41% and less than 1%; |
| $F_2$ | greater than or equal to 0.05% and less than 1%; and |
| $B_2O_3$ | greater than 0% and less than 0.1%; | wherein
the weight percentage ratio of CaO/MgO is greater than 2 and less than or equal to 2.4; and
a weight percentage ratio $SiO_2$/CaO is 3.5-4.0.

11. The composition of claim 10, comprising greater than 2% and less than 3.5% by weight of $Ti_2O$.

12. A glass fiber, being produced using the composition of claim 1.

13. The fiber of claim 12, wherein the composition further comprises greater than 0% and less than 0.1% by weight of $B_2O_3$.

14. The fiber of claim 12, wherein the composition comprises greater than 2% and less than 3.5% by weight of $Ti_2O$.

15. The fiber of claim 12, wherein the composition comprises greater than or equal to 0.05% and less than 0.3% by weight of $F_2$, and greater than or equal to 0.01% and less than 0.1% by weight of $Li_2O$; and a weight percentage ratio $SiO_2$/CaO is 3.4-4.2.

16. The fiber of claim 12, wherein
the composition comprises the following components with corresponding percentage amounts by weight:

| | |
|---|---|
| $SiO_2$ | 58.5-60.4%; |
| $Al_2O_3$ | 14.5-16.5%; |
| CaO + MgO | 20-24.5%; |
| CaO | greater than 14%; |
| $Li_2O$ | 0.01-0.5%; |
| $Na_2O + K_2O$ | less than 2%; |
| $TiO_2$ | less than 3.5%; |
| $Fe_2O_3$ | greater than or equal to 0.41% and less than 1%; |
| $F_2$ | greater than or equal to 0.05% and less than 1%; and |
| $B_2O_3$ | greater than 0% and less than 0.1%; | the weight percentage ratio of CaO/MgO is greater than 2 and less than or equal to 2.4; and
a weight percentage ratio $SiO_2$/CaO is 3.5-4.0.

17. A composite material, comprising the glass fiber of claim 12.

18. The material of claim 17, wherein the composition of the glass fiber further comprises greater than 0% and less than 0.1% by weight of $B_2O_3$.

19. The material of claim 17, wherein the composition of the glass fiber comprises greater than or equal to 0.05% and less than 0.3% by weight of $F_2$, and greater than or equal to 0.01% and less than 0.1% by weight of $Li_2O$; and a weight percentage ratio $SiO_2$/CaO is 3.4-4.2.

20. The material of claim 17, wherein
the composition of the glass fiber comprises the following components with corresponding percentage amounts by weight:

| | |
|---|---|
| $SiO_2$ | 58.5-60.4%; |
| $Al_2O_3$ | 14.5-16.5%; |
| CaO + MgO | 20-24.5%; |
| CaO | greater than 14%; |
| $Li_2O$ | 0.01-0.5%; |
| $Na_2O + K_2O$ | less than 2%; |
| $TiO_2$ | less than 3.5%; |
| $Fe_2O_3$ | greater than or equal to 0.41% and less than 1%; |
| $F_2$ | greater than or equal to 0.05% and less than 1%; and |
| $B_2O_3$ | greater than 0% and less than 0.1%; | the weight percentage ratio of CaO/MgO is greater than 2 and less than or equal to 2.4; and
a weight percentage ratio $SiO_2$/CaO is 3.5-4.0.

* * * * *